United States Patent
Henson et al.

(10) Patent No.: US 10,043,352 B2
(45) Date of Patent: Aug. 7, 2018

(54) TECHNIQUES FOR DETECTING A DISCONNECTED ENGINE AIR HOSE USING AN IN-LINE PRESSURE SENSOR

(71) Applicants: Scott E Henson, Chelsea, MI (US); Glen E Tallarek, Grosse Pointe Woods, MI (US); Dhaval D Shah, Rochester Hills, MI (US); Vivek Venkatachalam, Recife (BR)

(72) Inventors: Scott E Henson, Chelsea, MI (US); Glen E Tallarek, Grosse Pointe Woods, MI (US); Dhaval D Shah, Rochester Hills, MI (US); Vivek Venkatachalam, Recife (BR)

(73) Assignee: FCA US LLC, Auburn Hills, MI (US)

( * ) Notice: Subject to any disclaimer, the term of this patent is extended or adjusted under 35 U.S.C. 154(b) by 16 days.

(21) Appl. No.: 15/264,644

(22) Filed: Sep. 14, 2016

(65) Prior Publication Data

US 2018/0075713 A1 Mar. 15, 2018

(51) Int. Cl.
*G08B 21/00* (2006.01)
*G08B 5/36* (2006.01)
*F01M 13/02* (2006.01)

(52) U.S. Cl.
CPC ............. *G08B 5/36* (2013.01); *F01M 13/022* (2013.01); *F01M 2013/027* (2013.01)

(58) Field of Classification Search
CPC .................. F01M 13/00; F01M 11/10; F01M 2013/0083; F01M 13/0011; F01M 1/18; F01M 2013/0044; F01M 13/023; F01M 2250/60; F01M 13/022; F01M 2013/027; F02D 41/22; Y02T 10/40; G01M 15/042; G08B 5/36

See application file for complete search history.

(56) References Cited

U.S. PATENT DOCUMENTS

| | | | |
|---|---|---|---|
| 5,792,949 | A | 8/1998 | Hewelt et al. |
| 7,080,547 | B2 | 7/2006 | Beyer et al. |
| 8,261,548 | B2 | 9/2012 | Ofner |
| 9,068,486 | B2 | 6/2015 | Rollinger et al. |
| 9,109,523 | B2 | 8/2015 | Sumilla et al. |
| 9,127,578 | B2 | 9/2015 | Pursifull et al. |
| 9,127,976 | B2 | 9/2015 | Pursifull |
| 9,207,142 | B2 | 12/2015 | Nethercutt et al. |
| 9,303,592 | B2 | 4/2016 | Pursifull |

(Continued)

*Primary Examiner* — Brian Zimmerman
*Assistant Examiner* — Kevin Lau
(74) *Attorney, Agent, or Firm* — Ralph E. Smith

(57) ABSTRACT

A diagnostic system for a crankcase ventilation system of a boosted engine includes a pressure sensor (i) disposed in-line along a make-up air (MUA) hose of the crankcase ventilation system and (ii) configured to measure a pressure in the MUA hose, the MUA hose connecting an induction system of the engine to a crankcase of the engine. The diagnostic system also includes a controller configured to: detect a mild acceleration operating condition of the engine; and in response to detecting the mild acceleration operating condition: obtain a plurality of pressure samples based on the measured pressure by the pressure sensor, compare the plurality of pressure samples to a fault threshold indicative of a disconnected MUA hose, and based on the comparing, generate a fault signal indicative of a disconnected MUA hose.

14 Claims, 6 Drawing Sheets

(56) References Cited

U.S. PATENT DOCUMENTS

| | | |
|---|---|---|
| 9,316,131 B2 | 4/2016 | Rollinger et al. |
| 9,382,823 B2 | 7/2016 | Rollinger et al. |
| 2014/0081548 A1* | 3/2014 | Pursifull .......... F02M 35/10222 |
| | | 701/101 |
| 2014/0081549 A1* | 3/2014 | Rollinger ............... F01M 13/00 |
| | | 701/101 |
| 2014/0081550 A1 | 3/2014 | Jentz et al. |
| 2016/0195449 A1* | 7/2016 | Haslbeck ............... F01M 13/00 |
| | | 73/47 |

* cited by examiner

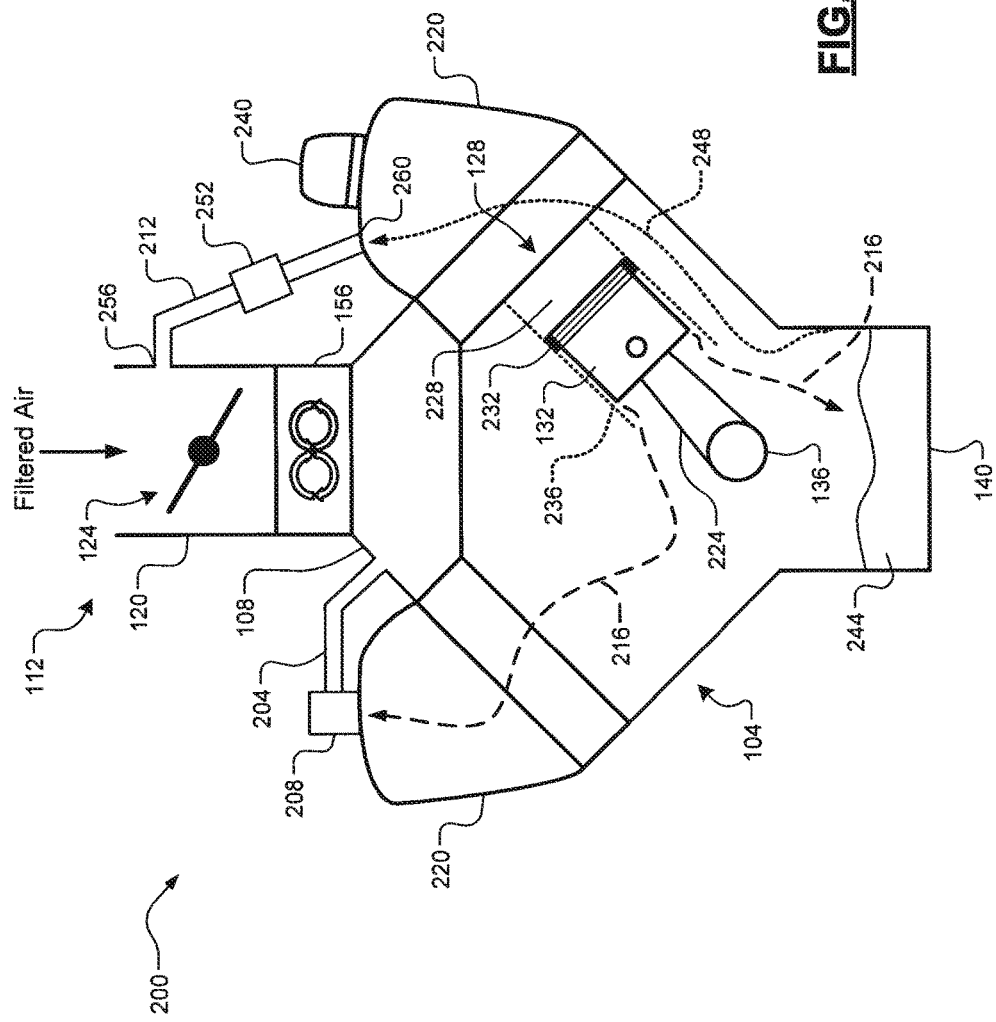

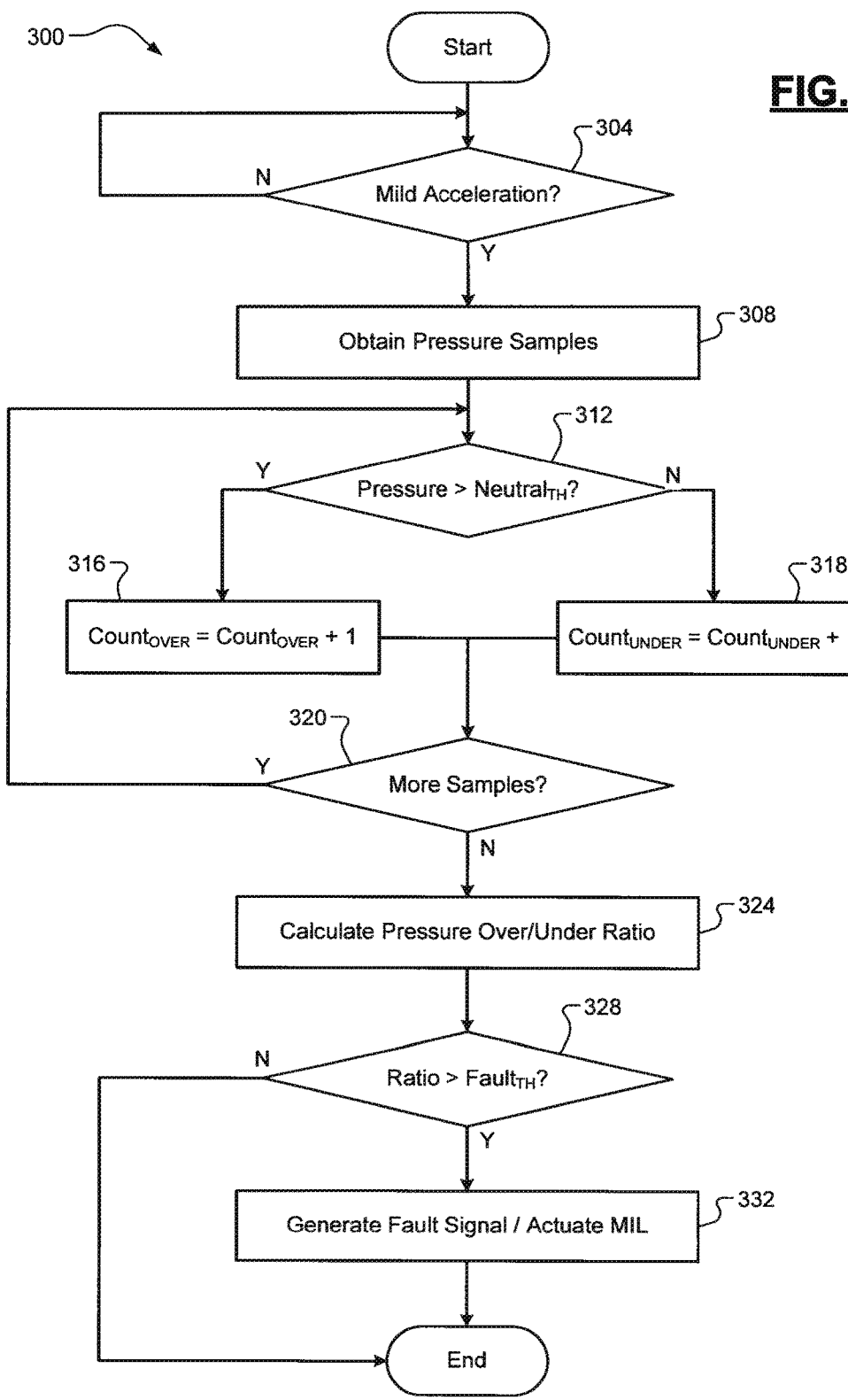

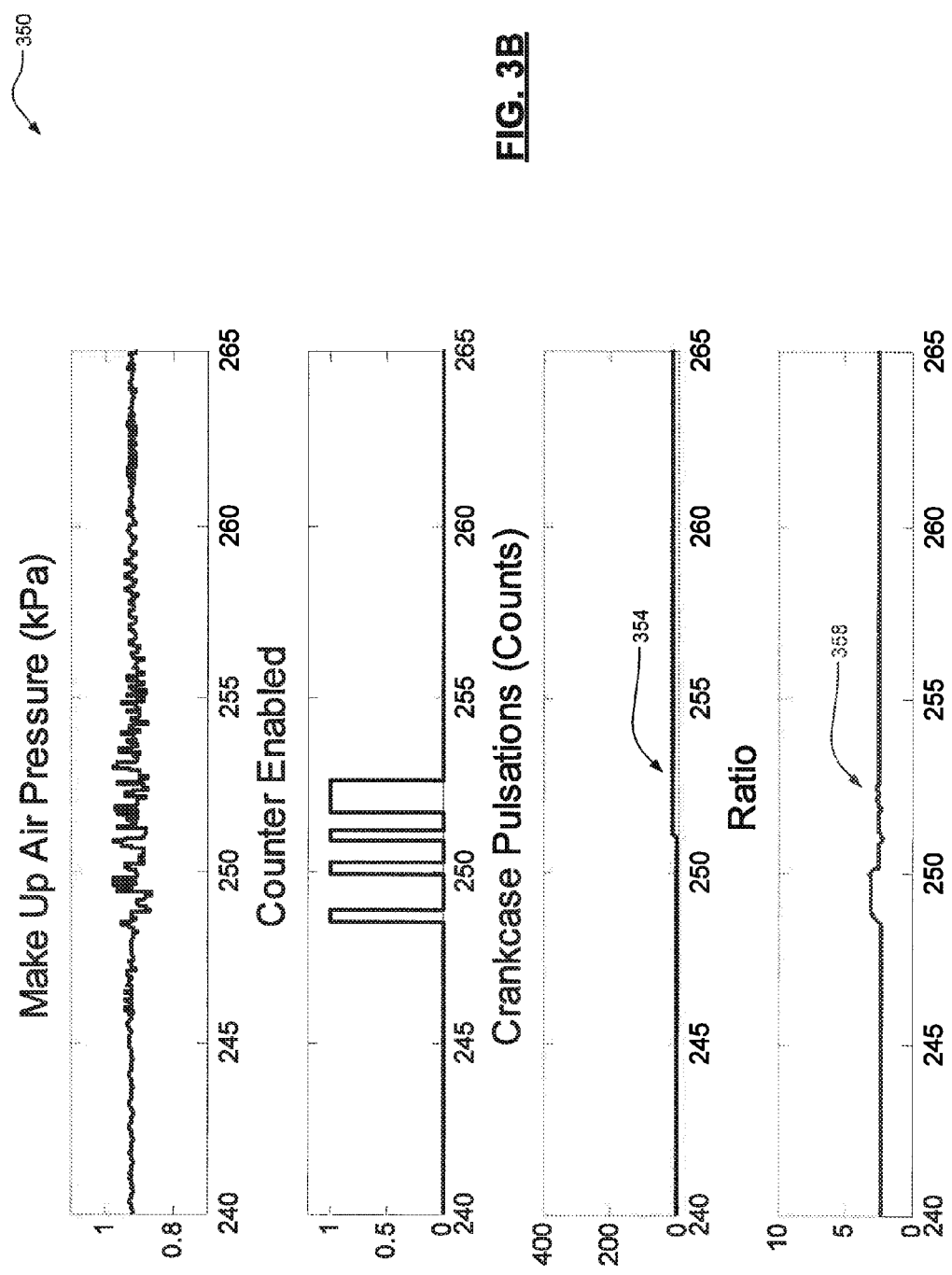

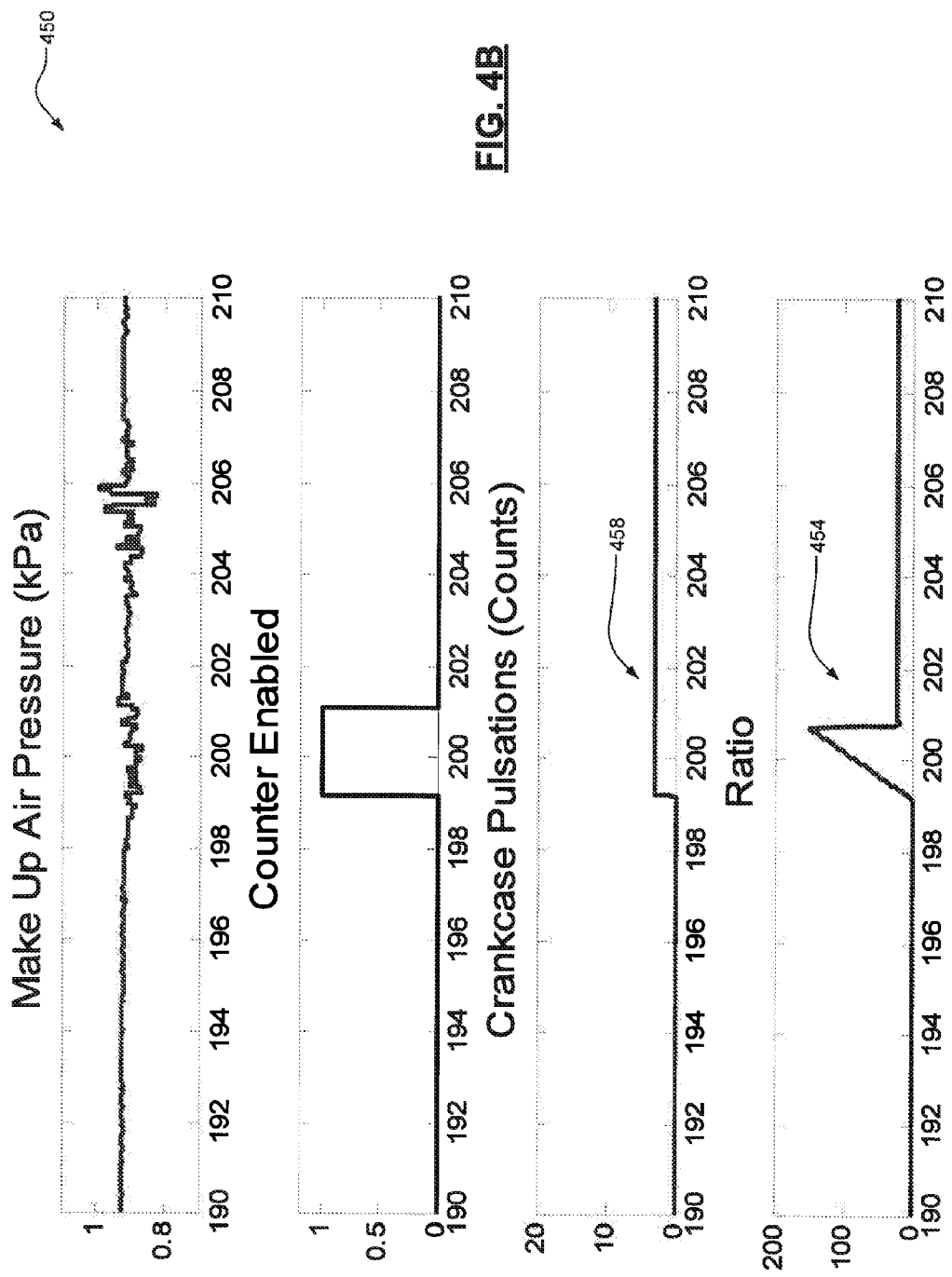

TECHNIQUES FOR DETECTING A DISCONNECTED ENGINE AIR HOSE USING AN IN-LINE PRESSURE SENSOR

FIELD

The present application generally relates to engine emissions diagnostics and, more particularly, to techniques for detecting a disconnected engine air hose using an in-line pressure sensor.

BACKGROUND

An engine draws fresh air into an intake manifold through an induction system (e.g., an intake duct having an air filter). A throttle valve is implemented downstream from the air filter and controls airflow through the induction system and into the intake manifold. The air in the intake manifold is distributed to a plurality of cylinders and combined with a fuel (e.g., via port or direct fuel injection) to create an air/fuel mixture. This air/fuel mixture is compressed by pistons within the cylinders (the compression stroke) and the compressed air/fuel mixture is ignited (e.g., by spark from spark plugs). Piston rings are used to form a seal between the pistons and walls of the cylinders. The combustion of the compressed air/fuel mixture (the power stroke) drives the pistons, which rotatably turn a crankshaft to generate drive torque. Exhaust gas resulting from combustion is expelled from the cylinders into an exhaust system.

The crankshaft is housed by a crankcase that includes lubricating fluid (e.g., oil). During the compression and power strokes, the air/fuel mixture (i.e., unburnt fuel) or exhaust gas sometimes escape the combustion chamber past the piston rings and enters the crankcase, which is also known as blow-by. Crankcase ventilation systems are therefore implemented to handle these blow-by vapors, which could dilute and/or degrade the oil overtime, thereby decreasing its ability to lubricate the crankshaft. Crankcase ventilation systems typically include a positive crankcase ventilation (PCV) hose and a PCV valve to control venting blow-by vapors from the crankcase and back into the intake manifold. More specifically, engine vacuum draws the blow-by vapors from the crankcase through an oil separator (e.g., a baffle) that removes any oil from the blow-by vapors and the blow-by vapor flow through the PCV hose is controlled by the PCV valve.

Crankcase ventilation systems typically also include a make-up air (MUA) hose. This MUA hose is connected to the crankcase and to the induction system at a point upstream from the intake manifold (e.g., before the throttle valve and after the air filter). The MUA hose is used to provide fresh air to the crankcase to better flush out the blow-by vapors. Emissions standards require detection of leaks in the crankcase ventilation system, which could cause blow-by vapors (e.g., unburnt fuel or untreated exhaust gas) to be expelled into the atmosphere. One such potential leak is a disconnected MUA hose. This disconnection could occur either at the crankcase side or at the induction system side. Conventional diagnostic systems, however, are (i) not configured to detect a disconnected MUA hose, (ii) inaccurate, and/or (iii) intrusive. Accordingly, while such diagnostic systems work for their intended purpose, there remains a need for improvement in the relevant art.

SUMMARY

According to one aspect of the invention, a diagnostic system for a crankcase ventilation system of an engine having a boost system is presented. In one exemplary implementation, the diagnostic system includes a pressure sensor (i) disposed in-line along a make-up air (MUA) hose of the crankcase ventilation system and (ii) configured to measure a pressure in the MUA hose, the MUA hose connecting an induction system of the engine at a point upstream from an intake manifold of the engine to a crankcase of the engine, and a controller configured to: detect a mild acceleration operating condition of the engine, and in response to detecting the mild acceleration operating condition: obtain a plurality of pressure samples based on the measured pressure by the pressure sensor, compare the plurality of pressure samples to a fault threshold indicative of a disconnected MUA hose, and based on the comparing, generate a fault signal indicative of a disconnected MUA hose.

According to another aspect of the invention, a diagnostic method for a crankcase ventilation system of an engine having a boost system is presented. In one exemplary implementation, the diagnostic method includes detecting, by a controller of the engine, a mild acceleration operating condition of the engine, and in response to detecting the mild acceleration operating condition: obtaining, by the controller, a plurality of pressure samples based on measured pressure by a pressure sensor, the pressure sensor being (i) disposed in-line along a make-up air (MUA) hose of the crankcase ventilation system and (ii) configured to measure pressure in the MUA hose, the MUA hose connecting an induction system of the engine at a point upstream from an intake manifold of the engine to a crankcase of the engine, comparing, by the controller, the plurality of pressure samples to a fault threshold indicative of a disconnected MUA hose, and based on the comparing, generating, by the controller, a fault signal indicative of a disconnected MUA hose.

In some implementations, the controller is further configured to: compare each pressure sample to a neutral pressure threshold, calculate a ratio of pressure samples under the neutral pressure threshold to pressure samples over the neutral pressure threshold, compare the calculated ratio to the fault threshold, and generate the fault signal when the calculated ratio is less than the fault threshold. In some implementations, the fault signal is indicative of the MUA hose being disconnected at the induction system-side. In some implementations, the controller is further configured to obtain the neutral pressure based on measured pressure by the pressure sensor during an idle operating condition of the engine.

In some implementations, the controller is further configured to: compare each pressure sample to a pressure pulsation threshold, calculate a quantity of the plurality of pressure samples that are greater than the pressure pulsation threshold to obtain a pressure pulsation count, compare the pressure pulsation count to the fault threshold, and generate the fault signal when the pressure pulsation count is less than the fault threshold. In some implementations, the fault signal is indicative of the MUA hose being disconnected at the crankcase-side.

In some implementations, the measured pressure by the pressure sensor includes pressure pulsations corresponding to vibration of air in the crankcase caused by movement of pistons of the engine. In some implementations, the boost system includes a supercharger, and the measured pressure by the pressure sensor includes pressure pulsations caused by the supercharger. In some implementations, the controller is further configured to actuate a malfunction indicator lamp (MIL) based on the fault signal.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 2 is a diagram of an example crankcase ventilation system according to the principles of the present disclosure;

FIG. 3A is a flow diagram of a first example diagnostic method for a crankcase ventilation system of an engine according to the principles of the present disclosure;

FIG. 3B includes example plots illustrating a diagnostic for a disconnection of a make-up air (MUA) hose at an induction-side according to the principles of the present disclosure;

FIG. 4B includes example plots illustrating a diagnostic for a disconnection of an MUA hose at crankcase-side according to the principles of the present disclosure.

DETAILED DESCRIPTION

As previously discussed, there is a need for diagnostic systems for crankcase ventilation systems that are capable of accurately and non-intrusively detecting a disconnected make-up air (MUA) hose. This is particularly true for boosted engines (turbocharged, supercharged, etc.). During non-boost (vacuum) conditions, a positive crankcase ventilation (PCV) valve is opened and blow-by vapors are drawn from the crankcase through a PCV hose and into the intake manifold. Also during non-boost conditions, an MUA valve (e.g., a check valve) along the MUA hose is opened and fresh air is drawn into or through the crankcase and into the PCV portion of the crankcase ventilation system.

During boost, however, the PCV valve is closed because there is no engine vacuum to draw the blow-by vapors. The MUA valve along the MUA hose is similarly closed during boost. Thus, there is no pressure difference across the MUA hose during boost that could be used as part of a disconnected MUA hose diagnostic. Small pressure pulsations corresponding to vibration of air in the crankcase, however, are sometimes caused by movement of the pistons. This may be particularly true for boosted engines that generate a large amount of drive torque. Component location may also cause these or other pressure pulsations, such as the mounting location of a supercharger proximate the MUA hose.

Accordingly, improved diagnostic techniques for detecting a disconnected MUA hose of a crankcase ventilation system of an engine are presented. These techniques utilize a pressure sensor disposed in-line along the MUA hose to measure pressure pulsations that propagate from the crankcase along the MUA house that are then used to detect whether the MUA hose is disconnected at either end. In some implementations, a particular operating condition, such as a mild acceleration operating condition of the engine, is a precondition for performing the diagnostic techniques herein. A mild acceleration operating condition, for example, provides for larger pressure pulsations while also causing a small local decrease in pressure. This enables the diagnostic technique to better distinguish pressure pulsations from a threshold. These diagnostic techniques also provide for accurate detection of both disconnected MUA hose scenarios in a manner that is non-intrusive to a driver.

Figure 1:
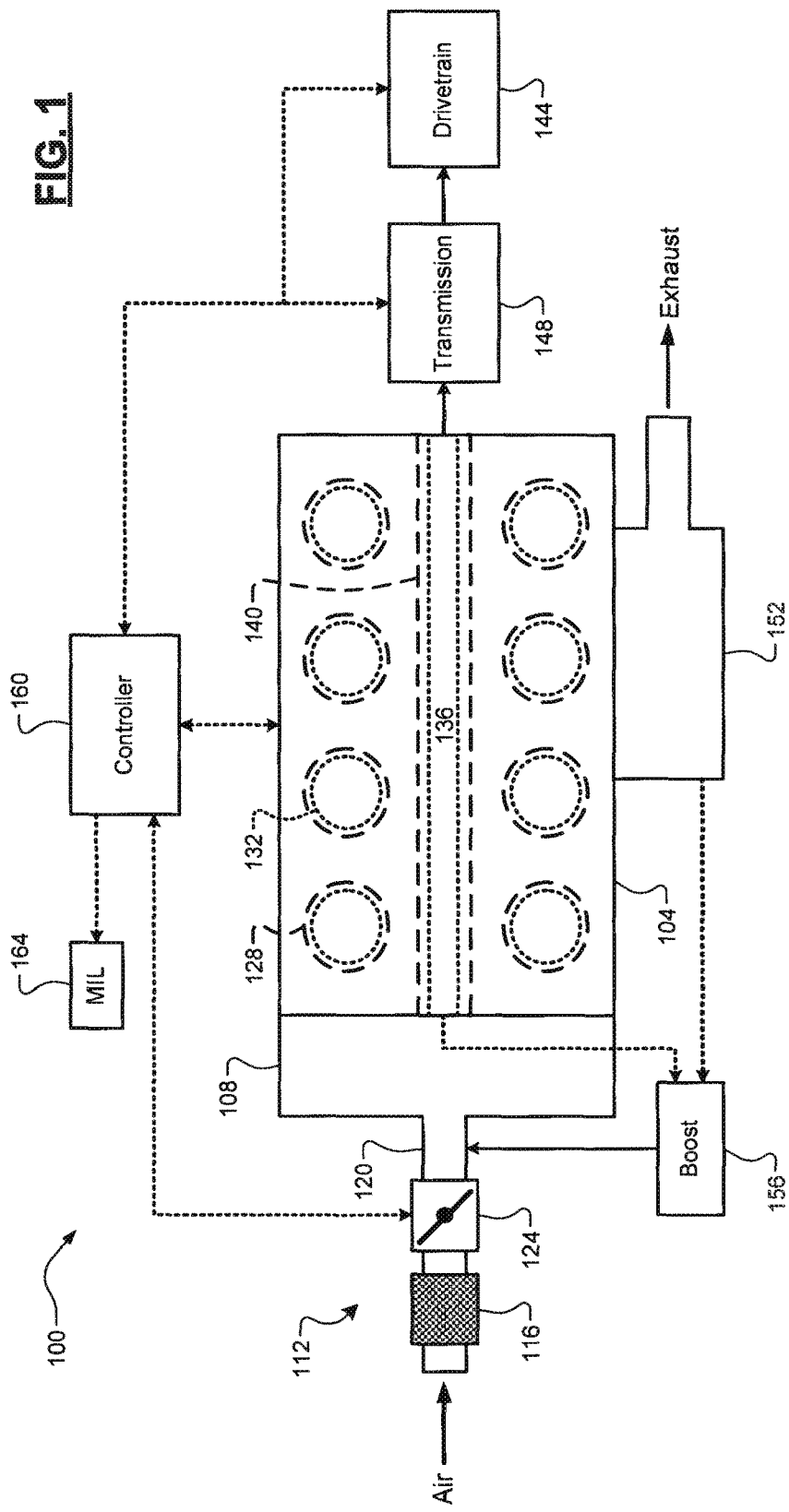
FIG. 1 is a diagram of an example engine system according to the principles of the present disclosure.

Referring now to FIG. 1, an example engine system 100 is illustrated. The engine system 100 includes an engine 104 that is configured to combust an air/fuel mixture to generate drive torque to propel a vehicle. The engine 104 is any suitable engine, such as a spark-ignition (SI) engine having direct or port fuel injection. The engine 104 draws fresh air into an intake manifold 108 through an induction system 112. The induction system 112 includes an air filter 116 that filters the fresh air and a fresh air duct 120 that provides the fresh air to the intake manifold 108. A throttle valve 124 controls the flow of fresh air into the intake manifold 108. The air in the intake manifold 108 is distributed to a plurality of cylinders 128. While eight cylinders are shown, it will be appreciated that the engine 104 could include any number of cylinders.

The air is combined with a fuel (e.g., gasoline from a fuel system (not shown)) to form an air/fuel mixture in each of the cylinders 128. The air/fuel mixture is compressed within the cylinders 128 by pistons 132 and the compressed air/fuel mixture is ignited (e.g., by spark from an ignition system (not shown)). The combustion of the compressed air/fuel mixture drives the pistons 132, which rotatably turn a crankshaft 136 to generate drive torque. The crankshaft 136 resides in a crankcase 140 that includes oil for lubrication of the crankshaft 136. The drive torque at the crankshaft 136 is then transferred to a drivetrain 144 (e.g., wheels of a vehicle) via a transmission 148. Exhaust gas resulting from combustion is expelled from the cylinders 128 into an exhaust system 152 that treats the exhaust gas.

A boost system 156 pressurizes or forces additional air into the intake manifold 108 and into the cylinders 128. This increased air charge, when combined with additional fuel, allows the engine 104 to generate a greater amount of drive torque. In one exemplary implementation, the boost system 156 is a supercharger having a compressor that is mechanically driven by the engine 104 (e.g., via the crankshaft 136). While the boost system 156 is hereinafter referred to as supercharger 156, it will be appreciated that the boost system could additional or alternatively include a turbocharger having a turbine powered by the exhaust gas that in turn powers a compressor. A controller 160 controls operation of the engine 104, such as controlling airflow into the engine (the throttle valve 124, the boost system 156, etc.), fuel, and spark. The controller 160 also selectively actuates a malfunction indicator lamp (MIL) 164.

Referring now to FIG. 2, an example crankcase ventilation system 200 is illustrated. While not necessarily shown, it will be appreciated that the crankcase ventilation system 200 may include other suitable components, such as check valves and/or other sensors. As shown, airflow into the intake manifold 108 of the engine 104 through the fresh air duct 120 is controlled by the throttle valve 124. The supercharger 156 is arranged downstream from the throttle valve 124 and forces the filtered air into the intake manifold 108, which enables the engine 104 to generate a greater amount of drive torque. While not explicitly shown, it will be appreciated that the supercharger 156 is driven either directly or indirectly (e.g., via a camshaft) by the crankshaft 136.

The crankcase ventilation system 200 generally includes a PCV hose 204, a PCV valve 208, and an MUA hose 212. The MUA hose 212 may also have a check valve (not shown) associated therewith. Blow-by vapors 216 in the crankcase 140 are siphoned up to the PCV valve 208 through a valve cover 220 of the engine 104. The piston 132 is driven by the crankshaft 136 via a connecting rod 224. These blow-by vapors 216 include unburnt fuel (from the compression stroke of the piston 132) and/or exhaust gas (from the power stroke of the piston 132) that escape a combustion chamber 228 of the cylinder 128 past a piston ring 232 that is implemented to form a seal between the piston 132 and a wall 236 of the cylinder 128. These blow-by vapors then enter the crankcase 140.

Fresh air is also provided to the crankcase 140 through the MUA hose 212 and the valve cover 220. If the MUA hose 212 were disconnected, however, these blow-by vapors could escape the crankcase 140 and be expelled into the atmosphere via the MUA hose 212. A sealed oil filler cap 240 allows the crankcase 140 to be filled with oil 244. As previously described, during boost conditions there is no substantial pressure difference across the MUA hose 212 that could be utilized in detecting a disconnected MUA hose 212. Small pressure pulsations 248 corresponding to vibration of air in the crankcase 140, however, are caused by movement of the pistons 132 and/or the proximate mounting of the supercharger 156 to the MUA hose 212. It will be appreciated that operation of the supercharger 156 could cause the air in the crankcase 140 to vibrate, thereby causing at least some of the pressure pulsations.

In one implementation, the magnitude of the pressure pulsations is a function of a quantity of the cylinders 128, the size/stroke of the pistons 132, and/or a volume of the crankcase 140. A pressure sensor 252 is disposed in-line along the MUA hose 212 in order to measure/detect these pressure pulsations 248. In order to detect a disconnection of the MUA hose 212 at both an induction system side (point 256) and a crankcase side (point 260), the pressure sensor 252 should be mounted in-line along the MUA hose 212 (i.e., not on/in the induction system 112 or on/in the valve cover 220). The pressure sensor 252 generates an analog pressure signal indicative of a pressure in the MUA hose 212. This pressure signal is communicated to the controller 160. It will be appreciated that the pressure sensor 252 could alternatively generate discrete pressure samples, which are discussed in greater detail below.

Referring now to FIG. 3A, a first example diagnostic method 300 for the crankcase ventilation system 200 of the engine 104 is illustrated. This method 300 is also referred to as an induction-side disconnection diagnostic method. At 304, the controller 160 detects whether the engine 104 is operating at a mild acceleration condition. This mild acceleration operating condition is, for example, an engine load/speed at which vibration of the air in the crankcase 140 occurs, causing the pressure pulsations to be more distinguishable. If true, the method 300 proceeds to 308. Otherwise, the method 300 ends or returns to 304. At 308, the controller 160 obtains a plurality of pressure samples based on the measured pressure by the pressure sensor 252. As previously mentioned, these pressure samples could be either output by the pressure sensor 252 or sampled by the controller 160 from a pressure signal output by the pressure sensor 252.

At 312, the controller 160 compares a particular pressure sample to a neutral pressure threshold (Neutral$_{TH}$). This neutral pressure threshold is indicative of a neutral or baseline pressure (i.e., a non-acceleration condition). In one exemplary embodiment, the controller 160 obtains the neutral pressure threshold based on the measured pressure by the pressure sensor 252 during an idle condition of the engine 104, such as at engine startup. When the pressure sample exceeds the neutral pressure threshold, an over counter (Count$_{OVER}$) is increased at 316. When the pressure sample is less than the neutral pressure threshold, an under counter (Count$_{UNDER}$) is increased at 318. At 320, the controller 160 determines whether there are any more pressure samples. In other words, the controller 160 determines if all of the pressure samples have been compared to the neutral pressure threshold. If true, the method 300 returns to 312. Otherwise, the method 300 proceeds to 324.

At 324, the controller 160 calculates a pressure over/under ratio indicative of a number of pressure samples that exceed the neutral pressure threshold to a number of pressure samples that are less than the neutral pressure threshold. More specifically, this ratio is the value of the over count Count$_{OVER}$ divided the under count Count$_{UNDER}$. At 328, the controller 160 determines whether the calculated ratio (Ratio) is greater than the fault threshold (Fault$_{TH}$). For this method 300, the fault threshold represents a low ratio that is indicative of the MUA hose 212 being disconnected at the induction-side. If true, the method 300 proceeds to 332 where the fault signal is generated (and, in some embodiments, the MIL 164 is actuated). Otherwise, the method 300 ends because there is no fault detected.

Referring now to FIG. 3B, plots 350 are illustrated for the measured pressure, an enable signal for the counter, a number of pressure pulsations, and the calculated ratio for a disconnection of the MUA hose 212 at the induction-side. The counter-enable signal could be set high (e.g., 1), for example, when the mild acceleration operating condition is detected. When the MUA hose 212 is disconnected at the induction-side, pressure pulsations are still captured by the pressure sensor 252 as is illustrated at 354. Thus, this is not a helpful quantity for the induction-side disconnection diagnostic method. When the MUA hose 212 is disconnected at the induction-side, however, there is no local pressure drop. In other words, the MUA hose is connected to the crankcase 140 or valve cover 220 and then to the ambient. Thus, the calculated over/under ratio should be low due to the lack of this local pressure drop. As shown at 358, this low calculated ratio is compared to the fault threshold (e.g., 5) and the fault signal is then generated when the calculated ratio is less than the fault threshold.

Figure 4A:
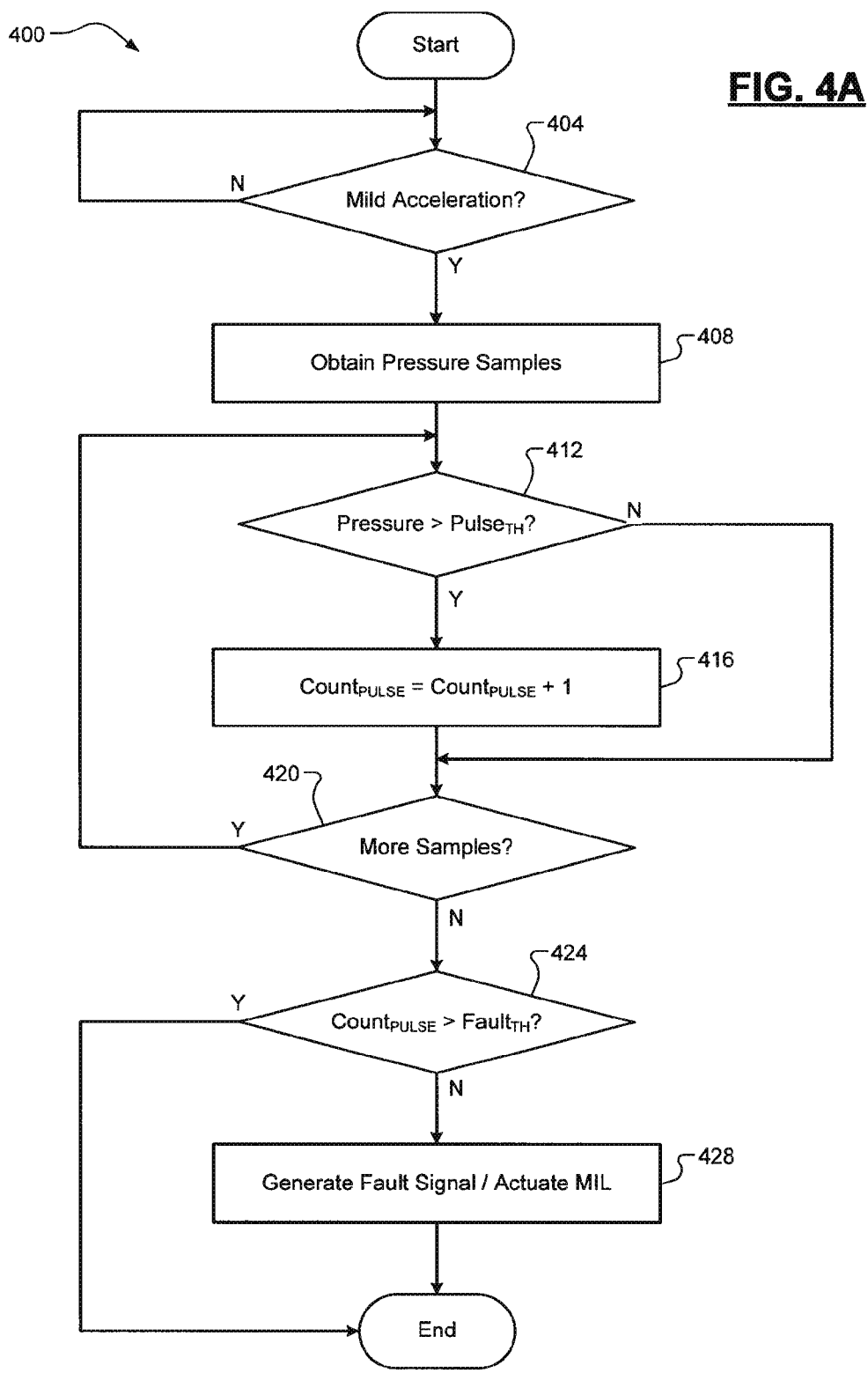
FIG. 4A is a flow diagram of a second example diagnostic method for a crankcase ventilation system of an engine according to the principles of the present disclosure.

Referring now to FIG. 4A, a second example diagnostic method 400 for the crankcase ventilation system 200 of the engine 104 is illustrated. This method 400 is also referred to as a crankcase-side disconnection diagnostic method. At 404, the controller 160 detects whether the engine 104 is operating at the mild acceleration condition. At 408, the controller 160 obtains the plurality of pressure samples. As previously mentioned, the pressure sensor 252 could provide these samples to the controller 160 or the controller 160 could obtain the samples from a pressure signal output by the pressure sensor 252. At 412, the controller 160 determines whether a particular pressure sample exceeds a pressure pulsation threshold (Pulse$_{TH}$). This pressure pulsation threshold has a magnitude that is indicative of the pressure sample being an actual pressure pulsation and not sensor noise.

When the pressure sample exceeds the pressure pulsation threshold, a pulse count is increased at 416. Otherwise, the method 400 proceeds to 420. At 420, the controller 160 determines whether there are any more pressure samples. In other words, the controller 160 determines if all of the pressure samples have been compared to the pressure pulsation threshold. If true, the method 400 proceeds to 424. Otherwise, the method 400 returns to 412. At 424, the controller 160 determines if the pulse count is greater than the fault threshold ($Fault_{TH}$). For this method 400, the fault threshold is a low number of pulsations representing a disconnection of the MUA hose at the crankcase-side. If false, the method 400 proceeds to 428 where the fault signal is generated (and, in some embodiments, the MIL 164 is actuated). If the pulse count exceeds the fault threshold, however, the method 400 ends because there is no fault detected.

Referring now to FIG. 4B, plots 450 are illustrated for the measured pressure, an enable signal for the counter, a number of pressure pulsations, and the calculated ratio for a disconnection of the MUA hose 212 at the crankcase-side. When the MUA hose 212 is disconnected at the crankcase-side, a high under/over ratio is still observed as illustrated at 454 because the local pressure drop across the pressure sensor 252 remains. Thus, this is not a helpful quantity for the crankcase-side disconnection diagnostic method. When the MUA hose 212 is disconnected at the crankcase-side, however, there are a small number of pressure pulsations counted. This is because zero or only a few pressure pulsations will manage to propagate through the MUA hose 212 because it is disconnected at the source of these pulsations. As shown at 458, this low calculated quantity of pressure pulsations is compared to the fault threshold (e.g., 5) and the fault signal is then generated when the calculated quantity is less than the fault threshold.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example, if appropriate, unless described otherwise above.

What is claimed is:

1. A diagnostic system for a crankcase ventilation system of an engine having a boost system, the diagnostic system comprising:
   a pressure sensor (i) disposed in-line along a make-up air (MUA) hose of the crankcase ventilation system and (ii) configured to measure a pressure in the MUA hose, the MUA hose connecting an induction system of the engine at a point upstream from an intake manifold of the engine to a crankcase of the engine; and
   a controller configured to:
   detect a mild acceleration operating condition of the engine; and
   in response to detecting the mild acceleration operating condition:
   obtain a plurality of pressure samples based on the measured pressure by the pressure sensor, and
   at least one of:
   (i) compare each pressure sample to a neutral pressure threshold, calculate a ratio of pressure samples under the neutral pressure threshold to pressure samples over the neutral pressure threshold, compare the calculated ratio to a first fault threshold indicative of a disconnected MUA hose, and generate a first fault signal indicative of a disconnected MUA hose when the calculated ratio is less than the first fault threshold, and
   (ii) compare each pressure sample to a pressure pulsation threshold, calculate a quantity of the plurality of pressure samples that are greater than the pressure pulsation threshold to obtain a pressure pulsation count, compare the pressure pulsation count to a second fault threshold indicative of a disconnected MUA hose, and generate a second fault signal indicative of a disconnected MUA hose when the pressure pulsation count is less than the second fault threshold.

2. The diagnostic system of claim 1, wherein the controller is further configured to obtain the neutral pressure based on measured pressure by the pressure sensor during an idle operating condition of the engine.

3. The diagnostic system of claim 1, wherein the first fault signal is indicative of the MUA hose being disconnected at the induction system-side.

4. The diagnostic system of claim 1, wherein the second fault signal is indicative of the MUA hose being disconnected at the crankcase-side.

5. The diagnostic system of claim 1, wherein the measured pressure by the pressure sensor includes pressure pulsations corresponding to vibration of air in the crankcase caused by movement of pistons of the engine.

6. The diagnostic system of claim 1, wherein the boost system includes a supercharger, and wherein the measured pressure by the pressure sensor includes pressure pulsations caused by the supercharger.

7. The diagnostic system of claim 1, wherein the controller is further configured to actuate a malfunction indicator lamp (MIL) based on at least one of the first and second fault signals.

8. A diagnostic method for a crankcase ventilation system of an engine having a boost system, the diagnostic method comprising:
   detecting, by a controller of the engine, a mild acceleration operating condition of the engine; and
   in response to detecting the mild acceleration operating condition:
   obtaining, by the controller, a plurality of pressure samples based on measured pressure by a pressure sensor, the pressure sensor being (i) disposed in-line along a make-up air (MUA) hose of the crankcase ventilation system and (ii) configured to measure pressure in the MUA hose, the MUA hose connecting an induction system of the engine at a point upstream from an intake manifold of the engine to a crankcase of the engine, and
   by the controller, at least one of:

(i) comparing each pressure sample to a neutral pressure threshold, calculating a ratio of pressure samples under the neutral pressure threshold to pressure samples over the neutral pressure threshold, comparing the calculated ratio to a first fault threshold indicative of a disconnected MUA hose, and generating a first fault signal indicative of a disconnected MUA hose when the calculated ratio is less than the first fault threshold, and (ii) comparing each pressure sample to a pressure pulsation threshold, calculating a quantity of the plurality of pressure samples that are greater than the pressure pulsation threshold to obtain a pressure pulsation count, comparing the pressure pulsation count to a second fault threshold indicative of a disconnected MUA hose, and generating a second fault signal indicative of a disconnected MUA hose when the pressure pulsation count is less than the second fault threshold.

9. The diagnostic method of claim 8, wherein the first fault signal is indicative of the MUA hose being disconnected at the induction system-side.

10. The diagnostic method of claim 8, further comprising obtaining, by the controller, the neutral pressure threshold based on measured pressure by the pressure sensor during an idle operating condition of the engine.

11. The diagnostic method of claim 8, wherein the second fault signal is indicative of the MUA hose being disconnected at the crankcase-side.

12. The diagnostic method of claim 8, wherein the measured pressure by the pressure sensor includes pressure pulsations corresponding to vibration of air in the crankcase caused by movement of pistons of the engine.

13. The diagnostic method of claim 8, wherein the boost system includes a supercharger, and wherein the measured pressure by the pressure sensor includes pressure pulsations caused by the supercharger.

14. The diagnostic method of claim 8, further comprising actuating, by the controller, a malfunction indicator lamp (MIL) based on at least one of the first and second fault signals.

* * * * *